(12) United States Patent
Hallström

(10) Patent No.: US 8,870,539 B2
(45) Date of Patent: Oct. 28, 2014

(54) WIND TURBINE WITH CONTROL SYSTEM

(75) Inventor: Jonas Hallström, Torslanda (SE)

(73) Assignee: XEMC, Xiangtan Electric Manufacturing Group Corporation Ltd., Xiangtan (KR)

( * ) Notice: Subject to any disclaimer, the term of this patent is extended or adjusted under 35 U.S.C. 154(b) by 632 days.

(21) Appl. No.: 13/141,234

(22) PCT Filed: Jan. 7, 2010

(86) PCT No.: PCT/SE2010/050007
§ 371 (c)(1),
(2), (4) Date: Jun. 21, 2011

(87) PCT Pub. No.: WO2010/080061
PCT Pub. Date: Jul. 15, 2010

(65) Prior Publication Data
US 2011/0255969 A1    Oct. 20, 2011

(30) Foreign Application Priority Data
Jan. 7, 2009  (SE) ........................................ 0950001

(51) Int. Cl.
*B64C 11/00* (2006.01)
*F03D 7/02* (2006.01)

(52) U.S. Cl.
CPC ............ *F03D 7/0252* (2013.01); *F03D 7/0224* (2013.01); *F05B 2260/74* (2013.01); *F05B 2270/1011* (2013.01); *F05B 2270/107* (2013.01); *Y02E 10/723* (2013.01)
USPC ...................................... 416/165; 416/168 R

(58) Field of Classification Search
CPC ........ B64C 11/30; B64C 27/78; B64C 27/80; B63H 3/002; B63H 3/02; B63H 3/04; B63H 3/081; B63H 3/082; F03D 7/0244; F03D 7/0224; F03D 7/0264; F05B 2270/328
USPC ......... 416/147, 159, 163, 164, 165, 166, 167, 416/168 R
See application file for complete search history.

(56) References Cited

U.S. PATENT DOCUMENTS 2,850,106 A * 9/1958 Swan ................................ 416/2
4,355,955 A   10/1982 Kisovec
(Continued)

FOREIGN PATENT DOCUMENTS

DE        42 21 783 A1     1/1994
GB        1588694 A        4/1981
WO        WO-2010059983 A2 5/2010

OTHER PUBLICATIONS

First Great British Office Action regarding Application No. GB1104756.0, dated Jun. 26, 2013.
(Continued)

*Primary Examiner* — Edward Look
*Assistant Examiner* — Christopher J Hargitt
(74) *Attorney, Agent, or Firm* — Harness, Dickey & Pierce, P.L.C.

(57) ABSTRACT

The present invention relates to a wind turbine assembly comprising a turbine having turbine blades, said turbine being arranged to generate a rotational energy as the turbine blades are engaged by a wind, characterized in that said wind turbine assembly further comprises an emergency brake that is operationally connected to the turbine blades for pitching the turbine blades towards a rest position by the rotational energy of the turbine, when the emergency brake is activated.

9 Claims, 1 Drawing Sheet

(56) References Cited

U.S. PATENT DOCUMENTS

| | | |
|---|---|---|
| 5,226,805 A | 7/1993 | Proven |
| 5,779,446 A * | 7/1998 | Althof et al. .................... 416/36 |
| 6,287,077 B1 * | 9/2001 | Muller ...................... 416/157 R |
| 6,609,889 B1 | 8/2003 | Vilsboll |
| 7,218,012 B1 | 5/2007 | Edenfeld |
| 8,167,553 B2 * | 5/2012 | Perkinson et al. ................ 416/1 |

OTHER PUBLICATIONS

International Search Report for PCT/SE2010/05007, mailed Apr. 13, 2010.

* cited by examiner

WIND TURBINE WITH CONTROL SYSTEM

CROSS-REFERENCE TO RELATED APPLICATIONS

This application is a 371 U.S. National Stage of International Application No. PCT/SE2010/050007, filed Jan. 7, 2010. This application claims priority to Swedish Patent Application No. 0950001-8, filed Jan. 7, 2009. The disclosures of the above applications are incorporated herein by reference.

TECHNICAL FIELD

The present invention relates to a wind turbine assembly comprising a turbine having turbine blades.

BACKGROUND ART

Within the area of wind turbine construction and operation, it is well known that a reliable and versatile control system is needed in order to achieve the desired function and energy output from the wind turbine while at the same time creating a safe and reliable environment in the vicinity of the wind turbine itself, where the risk of damages to the machinery and the surrounding area can be avoided.

While in operation, many kinds of control system for controlling the pitch of the turbine blades and for keeping the output from the wind turbine system at a desired level are known. However, there is also a need for an emergency system for stopping the turbine altogether if an unexpected event such as a power failure in the control system should occur.

A control system for controlling the pitch angles of turbine blades on a wind turbine is shown in U.S. Pat. No. 5,226,805, where the turbine blades are resiliently biased towards a rest position, using coiled springs to automatically vary the pitch angles of the turbine blades in response to variations in the wind speed and the load. This system allows for a convenient, low-tech control over the speed of the turbine in order to determine the desired output from the wind turbine. There is, however, no possibility at all for emergency shut-down of the system, which is a major disadvantage.

Another device for controlling the pitch angle of wind turbine blades is shown in DE 42 21 783, where an electrical motor rotates together with the main shaft of a wind turbine. The motor adjusts the pitch angle of the blades, but the system has no way of stopping the rotation of the wind turbine in the event of a power failure to the control system, since a disruption in the power supply to the control system would also disrupt the operation of the electrical motor itself.

A device for adjusting the pitch and stopping the rotation of the blades of a wind turbine is shown by U.S. Pat. No. 6,609,889 (Vilsboll), where a separate brake is added for braking the rotation of the turbine. This device is, however, dependent on a motor for altering the pitch of the turbine blades, and in the event of a malfunction of this motor or a loss of energy in the system, a situation might arise where the turbine itself is halted but the turbine blades are still pitched to an operating position. In this event, a considerable load is added to the wind turbine by the force of the wind on the turbine blades without the turbine itself being able to rotate, and this would create a considerable risk for damages to the entire wind turbine.

Another device for altering the pitch of turbine blades of a wind turbine is shown by U.S. Pat. No. 5,779,446 (Althof et al.), where a separate pitch motor is required for altering the pitch of the blades. This device is also at risk for serious damages in the event of a sudden power loss, since the pitch of the turbine blades cannot in this event be pitched to feather in a safe way, in order to minimize air resistance.

There is therefore a need for a wind turbine with a control system that has a mechanism for emergency braking in a reliable and efficient manner.

DISCLOSURE OF THE INVENTION

The object of the present invention is to eliminate or at least to minimize the problems described above. This is achieved through a wind turbine assembly comprising a turbine having turbine blades, said turbine being arranged to generate a rotational energy as the turbine blades are engaged by a wind wherein said wind turbine assembly further comprises an emergency brake that is operationally connected to the turbine blades for pitching the turbine blades towards a rest position by the rotational energy of the turbine, when the emergency brake is activated. Thereby, a fail-safe braking of the turbine blades can be achieved, and the risk of damages to the wind turbine or the surrounding area due to the wind turbine assembly being out of control can be substantially lowered or even eliminated. Since the only energy required for braking the turbine is the rotational energy that is in the turbine at the time of activating the emergency brake, the braking is especially safe and reliable.

Also, if the rotational energy of the turbine is not sufficient to pitch the turbine blades all the way to a rest position, the interaction of the wind with the turbine blades will generate additional rotational energy, and the wind itself will in this way control the transition from an operation pitch of the turbine blades to the rest position where the air resistance is at its lowest, and this further adds to the reliability of the system and the security in not needing specific operation from the control systems in the wind turbine assembly for stopping the rotating motion of the turbine.

According to an aspect of the invention, said emergency brake is operationally connected to at least one element that rotates with the turbine and arranged for transferring the rotational energy of the turbine from this element to the turbine blades and thereby alter the pitch of said turbine blades. Thereby, the altering of the pitch of the turbine blades can be performed in a convenient manner which further adds to the reliability and efficiency of the emergency brake.

According to a further aspect of the invention, the emergency brake includes two cooperating threaded parts, a first of the cooperating threaded parts rotating with the turbine blades and being operatively connected to the turbine blades for varying the pitch of the turbine blades by moving along its axial extension, and a second of the cooperating threaded parts being axially stationary, so that the pitch angle of the turbine blades is varied by their relative screwing displacement in relation to each other. Thereby, the pitch of the turbine blades can be varied in a controlled and continuous manner.

According to yet another aspect of the invention, the emergency brake is effectuated by rotational braking the second of the cooperating threaded parts, so that if the turbine blades are rotating the first of the cooperating threaded parts is axially moved by screwing on the second of the cooperating threaded parts, thereby altering the pitch angle of the turbine blades. Thereby, the braking of the second threaded part allows for the momentum of the turbine blades to perform the action of gradually decreasing the rotation of the turbine blades and the generator in a fail-safe manner, and makes it possible to use the wind itself as a braking agent, since any additional rotation of the turbine blades caused by the wind will result in a braking effect on the motion of the wind turbine until a complete standstill can be achieved.

According to a further aspect of the invention, the emergency brake includes a rotor secured to the second of the cooperating threaded parts, and a non rotating stator, and said emergency brake is effectuated by braking the motion of the rotor, thereby rotationally braking the second of the cooperating threaded parts. Thereby, the emergency brake can be effectuated in an easy and convenient manner, for instance by short-circuiting the assembly in such a way that the rotor is halted, and no further action is needed from the control system or the fail-safe mechanism in order to achieve the braking action.

According to yet another aspect of the invention, the wind turbine assembly includes a blade pitch actuator for varying the pitch of the turbine blades in response to pitch-command signals applied thereto, and a control circuit for generating pitch-command signals, said control circuit sending said command signals to said blade pitch actuator to command pitch angle changes. Thereby, the pitch of the turbine blades can be controlled during normal operation of the wind turbine assembly in order to control the speed and effect of the turbine so that a desired output from the system can be achieved.

According to another aspect of the invention, the pitch actuator includes the two cooperating threaded parts for varying the pitch of the turbine blades. Thereby, the pitch control as well as the emergency brake can be controlled by the same components in a reliable manner, resulting in an efficient and relatively simple construction that is cost effective as well as reliable.

According to a further aspect of the invention, the first of the cooperating threaded parts is a movable rod, having along at least a portion of its extension outer threads, rotating with the turbine blades and being operatively connected to the turbine blades for varying the pitch of the turbine blades, by moving said rod along its axial extension, and where the second of the cooperating threaded parts is an axially stationary nut with inner threads for threadingly engaging the outer threads of the rod, whereby said axial movement of the rod is controlled by varying the rotational speed of the nut in relation to the rotational speed of the rod. Thereby, a controlled and continuous movement can be achieved, and the operation of the pitch control thereby be performed in a desirable manner.

BRIEF DESCRIPTION OF THE DRAWINGS

The invention will now be described in more detail with reference to the appended drawings, wherein

FIG. 1b shows a planar view of a preferred embodiment of a wind turbine assembly according to the invention, where the turbine blades are pitched to feather as in FIG. 1a;

DETAILED DESCRIPTION OF THE INVENTION

Figure 1A:
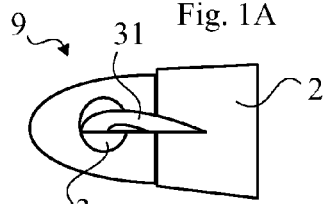
FIG. 1a shows an external view of the house of a preferred embodiment of a wind turbine assembly according to the invention where the turbine blades are pitched to feather.
Figure 1B:
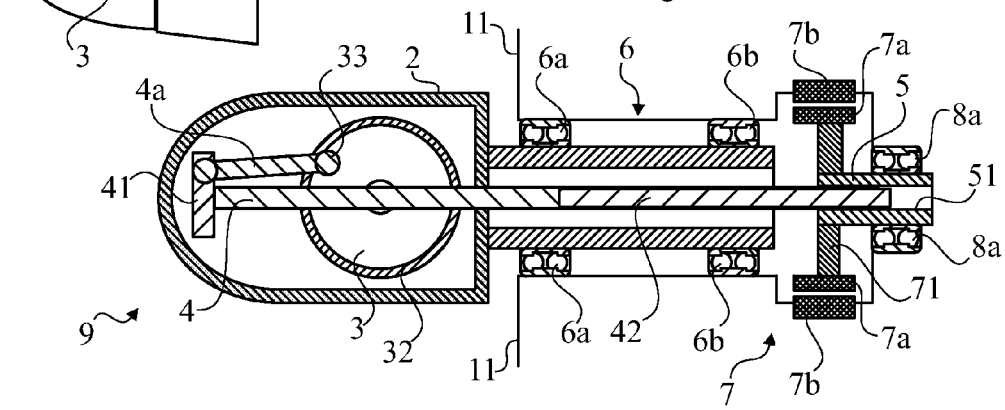

FIG. 1b shows a preferred embodiment of a wind turbine assembly according to the invention, comprising a house 11 housing a turbine 9.

The turbine 9 comprises a hub 2 having a flange 3 for securing a turbine blade 31 (not shown) via a blade bearing 32. Said flange 3 is rotatably arranged in said blade bearing 32, and is connected to a transversal rod 41 via a rotatably arranged rod 4a in such a way that the relative distance between a point 33 on the surface of the flange 3 and the fastening point on the transverse rod 41 is kept approximately constant. Thus, the flange 3 can move in relation to the hub 2 while at the same time keeping the distance between the point 33 and the rod 41 constant.

The hub 2 further comprises a number of other flanges for securing additional turbine blades (not shown) in such a way that a suitable number of turbine blades can be attached to the hub 2. These additional blades are attached to the transversal rod 41 in a manner similar to that described above, i.e. via a rotatably arranged rod for rotating the flanges while at the same time keeping the distance between a point on the flange and the transversal rod 41 constant.

The transversal rod 41 is also attached to a main axis in the form of a rod 4 which propagates from the rod 41 inside the hub 2 through a generator 6 of the turbine 9 and into a nut 5 of a pitch actuator 7. Said rod 4 is placed along the symmetry axis of said hub 2, generator 6 and pitch actuator 7, and has a first threaded portion 42.

The generator 6 is equipped with bearings 6a, 6b placed between said generator 6 and the house 11 in order for the turbine 9 to be able to rotate. At the generator 6, an electrical current is created from the rotational movements of the turbine 9 in a manner not shown and is fed to a power grid in the vicinity of the wind turbine assembly or is stored in a battery or other suitable power storing device.

On the other side of the generator 6 from where the hub 2 is located, the pitch actuator 7 is placed, comprising a rotor 7a and a nut such as a ball nut 5 with an inner threaded portion 51, suitable for interacting with the first threaded portion 42 of the rod 4. The rotor 7a, together with a corresponding stator 7b that is fixed to the house 11 in the axial vicinity of the rotor 7a, forms a pitch motor 71, preferably a direct driven motor, although other kinds can also be suitable for use with the wind turbine assembly described herein. The pitch actuator 7 can rotate around the symmetry axis of the turbine 9, i.e. in the same plane as the rod 4 and the generator 6, and the nut 5 of the pitch actuator 7 is further connected to the house 11 via bearings 8a in order to allow for its rotation.

The pitch motor 71 is powered by any suitable means, such as a battery or a power grid, but it is especially beneficial for the turbine 9 itself to power this motor 71.

The nut 5 has an inner, threaded surface 51 and is adapted for the first threaded part 42 of the rod 4 to fit into the threads of this second threaded part 51, thereby performing an axial, screwing motion of said rod 4. This movement will cause the rod 4 to move along the symmetry axis of the turbine 9 and the movement will be coupled to the turbine blades 31 through a linkage system where the rod 41 will move together with the main rod 4, thus moving also the rod 4a and the point 33 on the flange 3 where this rod 4a is attached so that in effect the flange 3 itself will be moved either clockwise or anti clockwise against the bearing 32 and thus turning the turbine blades 31.

In the situation depicted in FIG. 1b, the main rod 4 is in a position almost as far out of the ball nut 5 as the system will allow it to go, i.e. since any further movement of the main rod 4 towards the hull of the wind turbine assembly is limited by the length of the rod 4a. In this position, the turbine blade 31 is pitched to feather and so offers very low air resistance. Even if a steady wind is blowing, the turbine 9 will not be made to rotate, and so the wind turbine is at a standstill.

FIG. 1a shows an exterior view of the turbine 9, displaying the house 2 of the turbine with the flange 3 and a turbine blade 31 attached to the flange. The Figure shows the turbine blade 31 positioned so that the main axis of said turbine blade 31 extends in the same direction as the turbine 9 itself. This is the rest position of the turbine blade 31, which in this position is pitched to feather, and corresponds to that described above with reference to FIG. 1b.

Figure 2A:
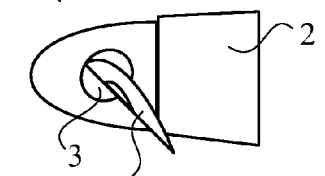
FIG. 2a shows an external view of the house of the embodiment of FIG. 1a with the turbine blades having the pitch angle of a suitable starting position.
Figure 2B:
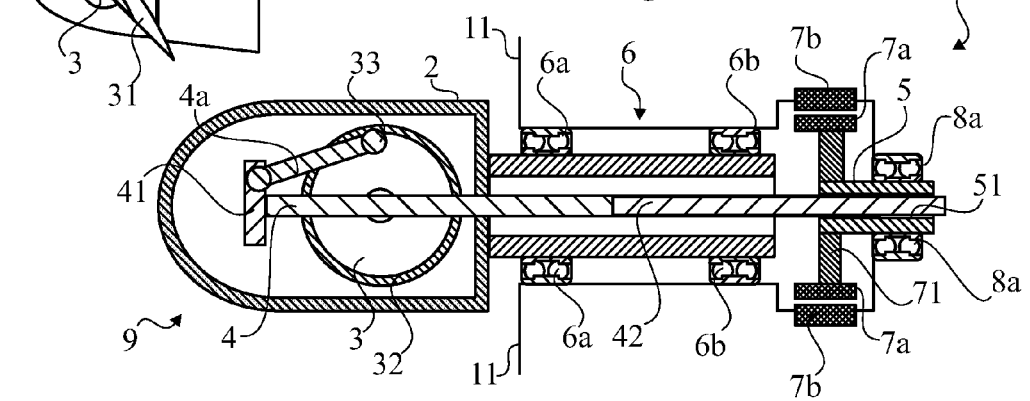
FIG. 2b shows a planar view of the embodiment of FIG. 1b, with the turbine blades having the pitch angle of a suitable starting position.

In FIG. 2b, the wind turbine assembly of FIGS. 1a, 1b is seen in a planar view, showing the turbine blade 31 in a starting position. The rod 4 now extends completely through the nut 5, pulling the rod 41 and the end of the rod 4a connecting thereto further towards the direction of the house 11 of the wind turbine assembly. This has caused the point 33, where the rod 4a is fastened to the flange 3, to move from the position of FIGS. 1a, 1b, thereby rotating the flange 3 clockwise so that the pitch angle of the turbine blade 31 has been increased to that of the starting position shown in the exterior view of FIG. 2a.

Figure 3A:
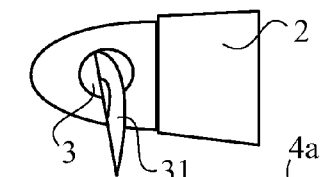
FIG. 3a shows an external view of the embodiment of FIGS. 1a and 2a, with the turbine blades having the pitch angle of a suitable operational position.
Figure 3B:
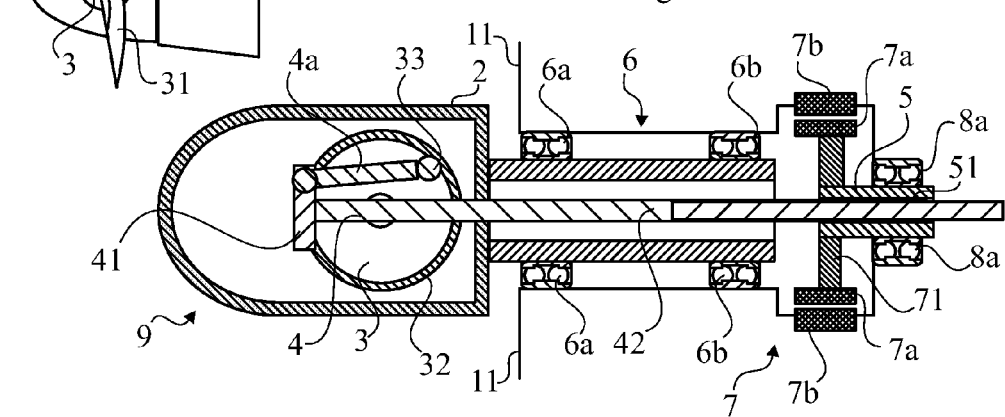
FIG. 3b shows a planar view of the embodiment of FIGS. 1b and 2b, with the turbine blades having the pitch angle of an suitable operational position.

FIG. 3b shows the wind turbine assembly at full operation, with the rod 4 extending well through the nut 5 and the rods 41 and 4a causing the point 33 of the flange 3 to be moved to a position almost 90° from the rest position shown in FIG. 1 along the bearing 33, creating a substantial air resistance and thereby causing the entire turbine 9 to rotate as the wind blows towards the turbine blades 31.

The operation of the wind turbine assembly will now be described in detail.

At a standstill, the turbine blades 31 are pitched to feather. In this position, the wind will generally not cause the turbine to rotate and so the wind turbine 1 is at rest. When the turbine is to be started, a control system (not shown) sends pitch control signals to the pitch motor 71, and the motor 71 actuates the pitch angle change by rotating the nut 5 so that the rod 4 is screwed further through the nut 5. This movement causes the transverse rod 41 and the rod 4a to move, resulting in a clockwise turning of the point 33 on the flange 3 along the bearing 32. The turbine blade 31, being attached to the flange 3, is turned clockwise along with said flange 3, thus altering the pitch angle of the blade 31 from the rest position shown in FIGS. 1a, 1b towards a starting position shown in FIGS. 2a, 2b. As the turning of the turbine blade 31 continues, the air resistance of the turbine blade 31 increases and this causes the power generator 9 to begin turning as the wind blows.

As the generator 6 rotates and thereby generates electrical current, the pitch actuator 7 rotates along with it, driven by the motor 7a, 7b so that its speed matches that of the generator 6, in order for the nut 5 and the rod 4 to rotate together and without causing a relative movement between the first threaded part 42 of the rod 4 and the second threaded part 51 of the nut 5, thus keeping the pitch angle of the turbine blades 31 constant. It would also be possible to cause the pitch actuator 7 to rotate thanks to the friction between the first threaded part 42 and the second threaded part 51. Thanks to the bearings 8a, the pitch actuator 7 can rotate freely.

From the starting position of FIGS. 2a, 2b, the control system can command an increase or decrease in pitch angle according to what is desired in order to achieve a determined output from the system. This is actuated by the pitch motor 71 increasing or decreasing the turning speed of the pitch actuator 7 with respect to the turning of the rod 4 caused by the rotation of the power generator 9 itself. An increasing in pitch angle of the turbine blades 31 is achieved by the pitch actuator 7 including the ball nut 5 turning faster than the rod 4, thereby causing the threaded parts 42, 51 to interact in such a way that the rod 4 is screwed further into and through the nut 5. The rods 4, 41, 4a are moved further towards the house 11 of the wind turbine 1 by this movement, thus moving also the point 33 on the flange 3 further clockwise along the bearing 32. Thereby, the turbine blade 31 will be turned further clockwise, creating an increase in pitch angle and thereby an increase in air resistance, which will in turn increase the speed of the generator 6 and generate a higher output from the system.

In order to decrease the pitch angle of the turbine blade 31, the pitch motor 71 acts to slow the pitch actuator 7 with the ball nut 5 down, so that it turns slower than the rod 4. The rod 4 will thereby be screwed out of the nut 5, and the rods 4, 41 and 4a moved further away from the house 11, thus moving the point 33 on the flange 3 further anti-clockwise along the bearing 32 and thereby also turning the blades 31 anti-clockwise, creating a decrease in pitch angle of the turbine blades 31 and a decrease in air resistance.

The generator 6 generates an electrical current, preferably by direct driven operation, but other kinds of operation would also be possible. The power thus generated can, as has been previously described, be inserted directly into a power grid or be stored in the vicinity of the wind turbine assembly. It can also be used for controlling the control system and the pitch motor 71.

If a situation should arise in which an emergency braking of the wind turbine 1 is desired, such as a power failure in the system or an unexpected event, the pitch actuator 7 is stopped by abruptly halting the pitch motor 71 is in order to decrease the rotational speed of the ball nut 5. This can be achieved by simply short-circuiting the pitch motor 71, which can be actuated immediately if a power failure occurs, or can alternately be arranged by the control system in the event of an emergency that is not related to a power failure. When the turning of the ball nut 5 is slowed down or stopped entirely, the rotational power remaining in the system from the rotation of the power generator 9 will in effect screw the rod 4 further into the ball nut 5 through the interaction of the threaded parts 42, 51, thus causing an anti-clockwise turning of the turbine blade 31 in the manner described above. This turning of the turbine blade 31 will decrease the pitch angle and will in itself cause the turbine to slow down, and the rotational energy in the system along with the wind will step by step screw the rod 4 further into the ball nut 5 as far as it can go, i.e. to the rest position shown in FIG. 1a above, where the pitch angle is at a minimum and the turbine blade 31 offers as little air resistance as possible. In this position, even a strong wind will cause essentially no rotation of the generator 6. This is beneficial, since the risk of damages to the wind turbine assembly or the surrounding area due to uncontrolled spinning is thereby substantially decreased.

It is to be noted that the hub 2 of the turbine 9 generally houses a plurality of flanges 3 for securing a plurality of turbine blades 31 via blade bearings 32, although only one of these flanges is shown in the figures. The remaining flanges and turbine blades are similar to that shown and described herein, in appearance as well as function and construction.

It is to be understood that the invention is not limited by the embodiments described above. Many variations could be undertaken within the scope of the appended claims, as the skilled person will realize. It would for instance be possible to use different kinds of transmission from the ball nut and the rod to the turbine blades for changing the pitch angle, or to use different kinds of motors and generators with the invention. Different construction of the interacting threaded areas are also possible, and many ways of braking the pitch actuator can be chosen within the scope of the claims. Many other variations are also possible, as the skilled person realizes.

The invention claimed is:

1. A wind turbine assembly comprising a turbine having turbine blades, said turbine being arranged to generate a rotational energy as the turbine blades are engaged by a wind, characterized in that said wind turbine assembly further comprises an emergency brake that is operationally connected to the turbine blades for pitching the turbine blades towards a rest position by the rotational energy of the turbine, when the emergency brake is activated, wherein the emergency brake includes at least two cooperating threaded parts, a first of the cooperating threaded parts rotating with the turbine and being operatively connected to the turbine blades for varying the pitch of the turbine blades by moving along its axial extension, and a second of the cooperating threaded parts being axially stationary, so that the pitch angle of the turbine blades is varied by the relative screwing displacement of the threaded parts in relation to each other, and the emergency brake is effectuated by rotationally braking the second of the cooperating threaded parts, so that if the turbine blades are rotated the first of the cooperating threaded parts is axially moved by screwing interaction with the second of the cooperating threaded parts, thereby altering the pitch angle of the turbine blades.

2. A wind turbine assembly according to claim 1, wherein said emergency brake is operationally connected to at least one element that rotates with the turbine and arranged for transferring the rotational energy of the turbine from this element to the turbine blades and thereby alter the pitch of said turbine blades.

3. A wind turbine assembly according to claim 1, wherein said rest position is a position where the turbine blades are pitched to feather.

4. A wind turbine assembly according to claim 1, wherein the emergency brake includes a motor comprising a rotor, secured to the second of the cooperating threaded parts, and a non rotating stator, and said emergency brake is effectuated by short circuiting the motor, thereby rotationally braking the second of the cooperating threaded parts.

5. A wind turbine assembly according to claim 1 wherein the emergency brake is effectuated by mechanically braking the second threaded part.

6. A wind turbine assembly according to claim 1, wherein said assembly includes a blade pitch actuator for varying the pitch of the turbine blades in response to pitch-command signals applied thereto, and a control circuit for generating pitch-command signals, said control circuit sending said command signals to said blade pitch actuator in order to command pitch angle changes.

7. A wind turbine assembly according to claim 6, wherein the pitch actuator includes the second cooperating threaded part for varying the pitch of the turbine blades.

8. A wind turbine assembly according to claim 1, wherein the first of the cooperating threaded parts is attached to a movable rod as outer threads, rotating with the turbine blades and being operatively connected to the turbine blades for varying the pitch of the turbine blades, by moving said rod along its axial extension, and where the second of the cooperating threaded parts is attached to an axially stationary nut as inner threads for threadingly engaging the outer threads of the rod, whereby said axial movement of the rod is controlled by varying the rotational speed of the nut in relation to the rotational speed of the rod.

9. A wind turbine according to claim 8, wherein movable rod rotating is operatively connected to the turbine blades through a linkage system.

* * * * *